United States Patent [19]

Obstfelder et al.

[11] Patent Number: 4,793,135
[45] Date of Patent: Dec. 27, 1988

[54] METHOD OF DETOXIFICATION OF EXHAUST GAS FROM AN INTERNAL COMBUSTION ENGINE USING A CATALYTIC SYSTEM, AND APPARATUS FOR PERFORMING THE METHOD

[76] Inventors: Matthias Obstfelder; Günther Obstfelder, both of Panoramastr. 28, 6940 Weinheim-Lützelsachsen; Hatto Seitz, Alemannenweg 1, D-6905 Schriescheim, all of Fed. Rep. of Germany

[21] Appl. No.: 910,469

[22] Filed: Sep. 23, 1986

[30] Foreign Application Priority Data

Apr. 26, 1986 [DE] Fed. Rep. of Germany ....... 3614251

[51] Int. Cl.$^4$ .............................................. F01N 3/20
[52] U.S. Cl. ........................................ 60/274; 60/276; 60/285; 60/301; 123/2; 123/443
[58] Field of Search ................. 60/274, 282, 301, 276, 60/285; 123/2, 443

[56] References Cited

U.S. PATENT DOCUMENTS

| | | | |
|---|---|---|---|
| 3,708,980 | 1/1973 | Truxell | 123/443 |
| 3,842,600 | 10/1974 | Nakajima | 60/301 |
| 4,000,614 | 1/1977 | Abthoff | 60/276 |
| 4,033,122 | 7/1977 | Masaki | 60/274 |
| 4,392,460 | 7/1983 | Williams | 123/56 AA |
| 4,409,949 | 10/1983 | Tanaka | 123/443 |

Primary Examiner—Douglas Hart
Attorney, Agent, or Firm—Staas & Halsey

[57] ABSTRACT

The invention relates to a method for detoxification of the exhaust gas from an internal combustion engine 1 using a catalytic system. The main toxic components in the exhaust gas mixture are carbon monoxide (CO), nitrogen oxides ($NO_x$) and hydrocarbons. The main toxic components CO and $NO_x$ are liberated from their interdependent relationship. The production of the main toxic components is quantitatively varied individually by regulation of separate combustion chambers. The toxic components from exhaust gas pipes of the respective combustion chambers are combined, in such a manner that in accordance with the proportions of the main toxic components, the composition of the exhaust gas mixture enables complete catalytic after-combustion conversion thereof in a known manner. An internal combustion engine has at least two combustion chambers having independent fuel preparation systems, which regulate the combustion process in terms of the proportions of the main toxic components in such a manner that quantitatively predetermined proportions of toxic substances in the exhaust gases are produced. After being mixed, the toxic components are detoxified practically completely with known catalytic systems. In an internal combustion engine operating on the self-ignition principle, if there is an insufficient amount of the main toxic component carbon monoxide for complete catalytic detoxification of the exhaust gas mixture, additional CO is supplied to the catalytic converter from a separate CO source.

6 Claims, 2 Drawing Sheets

METHOD OF DETOXIFICATION OF EXHAUST GAS FROM AN INTERNAL COMBUSTION ENGINE USING A CATALYTIC SYSTEM, AND APPARATUS FOR PERFORMING THE METHOD

BACKGROUND OF THE INVENTION

1. Field of the Invention

The present invention relates to a method of detoxification of exhaust gas from an internal combustion engine and an apparatus for performing the method. More particularly, the present invention relates to a catalytic system in which main toxic components of the exhaust gas mixture are liberated from their interdependent relationship.

2. Description of the Related Art

An internal combustion engine operating on the principle of externally supplied ignition primarily emits carbon monoxide (CO), nitrogen oxides ($NO_x$) and hydrocarbons ($C_mH_n$). While carbon monoxide and the nitrogen oxides are compounds that are unequivocally defined chemically, the terms "hydrocarbons" encompasses a great number of compounds, extending from methane to compounds having complex structures, some of which are suspected carcinogens.

The technology presently in use for cleansing the exhaust gas of internal combustion engines operating on the principle of externally supplied ignition (Otto engines), using the three-way catalytic converter and the lambda sensor, is primarily based on the following chemical reactions:

$$C_mH_n + (m+n/4)O_2 = mCO_2 + n/2 H_2O \qquad (1)$$

$$CO + \tfrac{1}{2}O_2 = CO_2 \qquad (2)$$

$$CO + NO = \tfrac{1}{2}N_2 \qquad (3)$$

$$C_mH_n + 2(m+n/4)NO = (m+n/4)N_2 + n/2 H_2O + mCO_2 \qquad (4)$$

$$CO + H_2O = CO_2 + H_2 \qquad (5)$$

$$CH + 2H_2O = CO_2 + (2+n/2)H_2 \qquad (6)$$

$$H_2 + NO = \tfrac{1}{2}N_2 + H_2O \qquad (7)$$

$$H_2 + \tfrac{1}{2}O_2 = H_2O \qquad (8)$$

To remove the toxic substances CO, $NO_x$ and $C_mH_n$ simultaneously, the precondition is that a fuel/air ratio of approximately the stoichiometric value, lambda=1, be adhered to within narrow limits. Only within this narrow range, known as the "lambda window", is a high conversion rate for the three toxic components attained. With modified catalytic converters, a certain widening of the "lambda window" is attainable.

The precondition for high conversion rates is that the fuel/air ratio fluctuates within a narrow range about the ratio of lambda=1, which is theoretically required for complete combustion. This is attainable by means of a control loop including so-called lambda sensor as a device for measuring oxygen in the exhaust gases. This method furnishes the most favorable result if the exhaust gas cleansing and the fuel consumption are optimized simultaneously. These provisions are accordingly applicable only to internal combustion engines operating on the principle of externally supplied ignition. Taken all in all, cleansing the exhaust gas with a three-way catalytic converter is a compromise between exhaust gas, fuel consumption and engine performance. Complete exhaust gas detoxification has not been possible so far; detoxification rates of up to a maximum of 90% were the best that could be attained. On this subject, see the publication by Edgar Koberstein entitled: Katalysatoren zur Reinigung von Autoabgasen *Catalytic Converters for Cleansing Automobile Exhaust Gases*, in "Chemie in unserer Zeit" *Chemistry in Our Times*, Vol, 18, 1984, No. 2, pp. 37–45.

The problems of internal combustion engines operating on the principle of self-ignition, that is, diesel engines, are completely different from those of internal combustion engines having externally supplied ignition (Otto engines). Although diesel engine powered vehicles are less polluting than Otto engine vehicles without catalytic converters, nevertheless, when compared to Otto engine vehicles with properly regulated catalytic converters, the diesel vehicles are considerably more polluting. The exhaust gases contain primarily nitrogen oxides and soot along with a little CH and CO (from 1/10 to 1/20 as much as in Otto engines). However, with increasing power output and vehicle speed $NO_x$ emissions increase considerably, yet it is the nitrogen oxides that since 1977 have been classified as particularly dangerous. Even after elimination of the soot by means of filters, further exhaust gas cleansing is impossible in diesel engines, because the appropriate quantities of carbon monoxide or hydrocarbons are not present for reducing the nitrogen oxides.

Of quite different significance is the fact that present diesel systems are not being operated at optimal thermodynamic efficiency. With materials of higher thermal stability that have already been used, such as ceramics, the efficiency of diesel engines can be increased enormously, and a more favorable utilization of energy is possible with the corresponding significant fuel economy. However, when the efficiency of the diesel engine is increased in this way, emissions of nitrogen oxides increase drastically as well, while in contrast the formation of soot and emissions of carbon monoxide and hydrocarbons become practically negligible.

SUMMARY OF THE INVENTION

It is accordingly an object of the present invention to devise a method for detoxification of the exhaust gases of an internal combustion engine of either the Otto and diesel type, in which while considerably widening the stoichiometric ratio of the lambda value, the exhaust gases are to be practically completely detoxified while simultaneously exploiting high engine efficiency.

The method according to the invention has as its prominent advantage that with it, the exhaust gases of both major types of internal combustion engines can be practically completely detoxified with the aid of known catalytic converter techniques in the form used at present for internal combustion engines operating on the principle of externally supplied ignition. In an extremely advantageous manner, in the method according to the invention the stoichiometric value of the fuel/air ratio, that is, the "lambda window", is widened considerably, and the close mutual dependency of the toxic substances, the carbon monoxide and the nitrogen oxides in particular, is obviated. As a result, by comparison with the prior art the method according to the present invention provides a considerably greater degree of freedom with respect to the necessity for compromise on engine performance. In applying the present invention, the exhaust gases from internal combustion engines having externally supplied ignition can be practically completely detoxified, this detoxification being even better than that attainable at present with known catalytic converter techniques.

However, of greater significance is the fact that with the method according to the present invention even the exhaust gases of internal combustion engines having self-ignition can be practically completely detoxified as well. This has so far been impossible using known methods. Because of the method according to the invention, it is possible to raise the temperature of combustion and hence the efficiency of self-igniting engines, since the increased incidence of nitrogen oxides this entails is overcome by furnishing the quantity of carbon monoxide required for complete reduction of the nitrogen oxides from a source of carbon monoxide, as needed. Since the creation of nitrogen oxides in the nascent state no longer needs to be kept to as low a level as possible, considerably higher combustion temperatures are therefore possible, which means considerably improved utilization of the energy contained in the diesel fuel and a more favorable engine weight per unit of power. Raising the combustion temperatures and the resultant combustion with an oxygen excess brings about completely spot-free combustion of the diesel fuel. This makes it possible to deliver the exhaust gases, with an admixture of additional carbon monoxide, to a known catalytic converter for complete detoxification. This was heretofore not possible for diesel engines, as the converter would become contaminated by soot and thus rendered useless within a short time.

Advantageously, the combination of a plurality of lambda control loops increase the range of freedom in engine design and widens the range of the "lambda window", and, regardless of the temperature (such as for cold starting) or engine performance, always furnishes the catalytic converter with an exhaust gas mixture having an optimal composition in terms of the ensuing catalytic detoxification process.

An advantageous embodiment of the method according to the present invention can be attained by constructing an engine with one component assembly operating on the self-ignition principle and another component assembly operating on the principle of externally supplied ignition, such that the combustion processes are controlled so that not only are the nitrogen oxides from the self-igniting combustion chamber completely reduced, but the carbon monoxide from the externally-ignited combustion chamber is completely oxidized as well.

A further advantage of having an engine having separate component assemblies operating on the self-ignition and the externally-supplied ignition principles is that diesel fuels and gasolines for use in motor vehicles will continue to be needed in a particular ratio to one another, and so the same proportional quantities of gasolines and diesel fuels can continue to be manufactured, without having to plan for an undue shift in the proportions used in favor of diesel fuels, or in favor of gasolines.

It is thus important that enough of each of the main toxic components is generated, quantitatively separately, so that when the exhaust gases from the component assemblies are mixed the toxic components will be catalytically oxidized or reduced completely; that is, there will always be enough carbon monoxide available to reduce the nitrogen oxides completely.

When an engine operating solely on the self-ignition principle is used, the carbon monoxide that is admixed before reaching the catalytic converter can be drawn from a separate source of carbon monoxide, such as a gas container containing carbon monoxide gas. That is, if one of the main toxic components arises in a quantitatively insufficient amount, then the missing amount of this component can be supplied from a separate source that contains this component. This embodiment may be advantageous for stationary diesel engines.

The method according to the present invention has preferred uses in moving vehicles or with diesel engines operated in a stationary location.

DESCRIPTION OF THE PREFERRED EMBODIMENT

Figure 1:
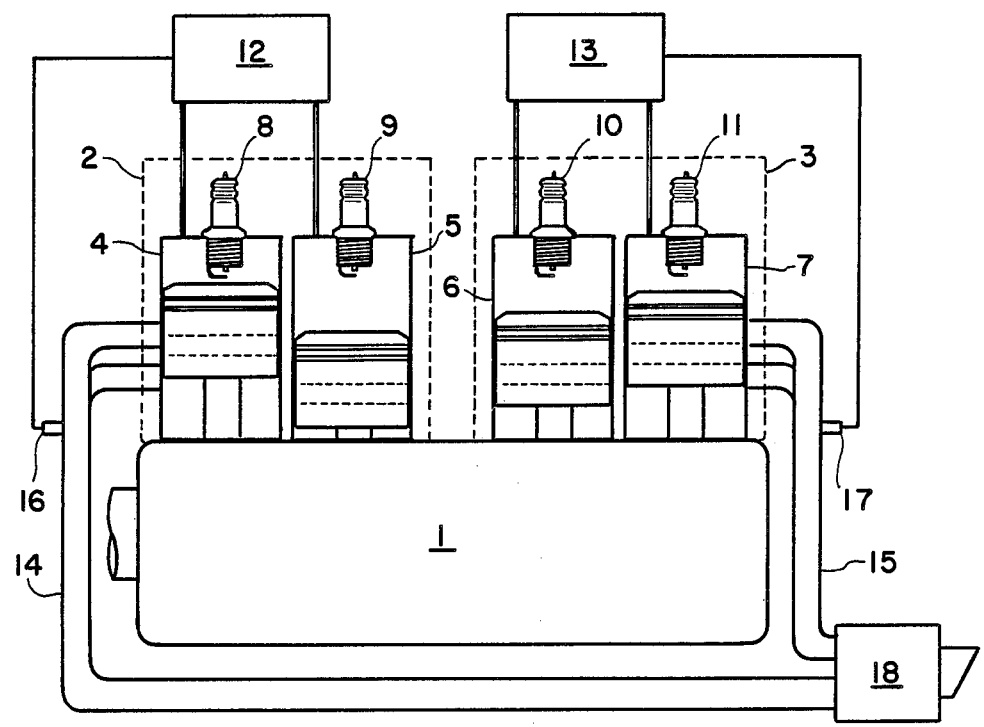
FIG. 1 shows the basic design of an internal combustion engine for applying the method according to the present invention, the combustion chamber being divided into two component assemblies which are supplied and regulated independently of each other.

Reference will now be made in detail to the invention and the present preferred embodiment of the invention, examples of which are illustrated in the accompanying figures in which identical elements are identified by the same reference numerals.

FIG. 1 illustrates in schematic form an internal combustion system 1 operating on the principle of externally supplied ignition. The engine 1 is divided into two component assemblies 2, 3 which include respective cylinders 4, 5 and cylinders 6, 7, each being equipped with respective spark plugs 8, 9, 10, 11 to represent the principle of externally supplied ignition. Exhaust gases exit from the first set of cylinders 4, 5 of the first component assembly 2 via a first exhaust gas line 14; and exhaust gases exit from the second set of cylinders 6, 7 of the second component assembly 3 via a second exhaust gas line 15. The exhaust gas lines 14, 15 discharge into a known catalytic converter 18.

Separate fuel preparation systems 12, 13 are dedicated to the component assemblies 2, 3 of the internal combustion engine 1. Thus, each of the exhaust gas lines 14, 15 corresponds to one of the fuel preparation systems 12, 13. Contained therein are sensors, for example, intended for measuring the oxygen in the exhaust gases, such as lambda sensors 16, 17, or for measuring the exhaust gases themselves. These sensors are operatively connected to their respective fuel preparation systems 12, 13 for the purpose of regulating them. The fuel preparation systems 12, 13 are regulatable independently of one another, so that the component assemblies 2, 3 of the respective combustion chambers 4, 5 and 6, 7 operates separately and independently of one another, are supplied with fuel and are regulatable in terms of their fuel/air ratio independently of one another via the associated lambda sensors 16, 17. The catalytic converter 18 is preferably a known single-bed, three-way catalytic converter, in which the detoxification of the exhaust gases combined from both exhaust gas line 14, 15 takes place.

During operation of the engine 1, the combustion chambers 4, 5 and 6, 7, are regulated independently of one another and individually by means of suitable sensor systems or suitable sensors (for example, with the aid of a CO sensor disposed following the catalytic converter). The combustion chambers 4, 5 and 8, 9 are regulated in order to generate the main toxic components, carbon monoxide and nitrogen oxides, at a ratio to one another such that after combining the exhaust gases from the exhaust gas lines 14, 15 a practically complete catalytic detoxification is assured in the known manner. Thus, the combustion processes are regulated with respect to the proportions of the main toxic components carbon monoxide and nitrogen oxides by means of suitable sensor systems or suitable sensors such that quantitatively predetermined proportions of the main toxic components occur preferentially in the exhaust gases, and adherence to these predetermined proportions leads, after the exhaust gases are put together, to a complete detoxification using known catalytic systems.

Figure 2:
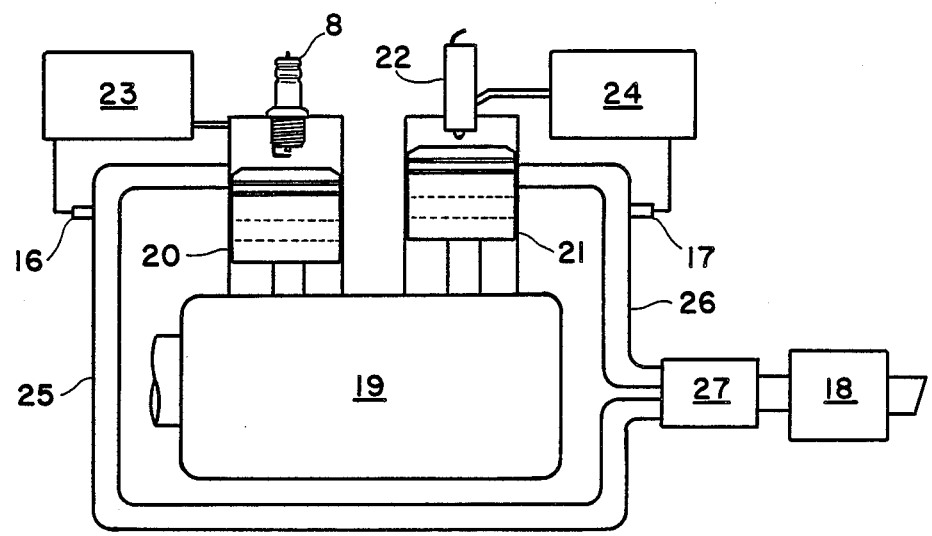
FIG. 2. shows the basic design of an internal combustion engine having the two combustion chamber component assemblies, one of which operates on the self-ignition principle and the other which operates on the principle of externally supplied ignition, both assemblies being supplied and regulated independently of each other by two independent fuel preparation systems.

FIG. 2 shows an internal combustion engine 19 having a first combustion chamber 20 operating on the principle of externally supplied ignition and a second combustion chamber 21 operating on the principle of self-ignition. The chambers 20, 21 operate independently of one another. To illustrate this arrangement, the first combustion chamber 20 has a spark plug 8, while the second combustion chamber 21 has a diesel injection nozzle 22. Associated with each of the combustion chambers 20, 21 are separately regulatable fuel preparation systems 23, 24, respectively. Exhaust gas lines 25, 26 take exhaust gases from the combustion chambers 20, 21, respectively, into a mixer 27 for mixing the exhaust gases together. From the mixer 27, a single exhaust gas line leads to the known catalytic converter 18. Sensor 16, 17, which can be lambda sensors, are disposed one each in the exhaust gas lines 25, 26, respectively. The sensors 16, 17 are operatively connected with the fuel preparation systems associated with its corresponding combustion chamber.

In this exemplary embodiment, the combustion chamber 20, in accordance with the principle of externally supplied ignition, generates carbon monoxide, which is required for reduction of the nitrogen oxides generated from the combustion chamber 21. In terms of capacity, the combustion chambers 20, 21 may be designed identically or approximately identically; in any case, the total output is produced by body component assemblies together. In terms of the operation of the engine 19, the description of the operation of the engine 1 of FIG. 1 is equally applicable here.

Figure 3:
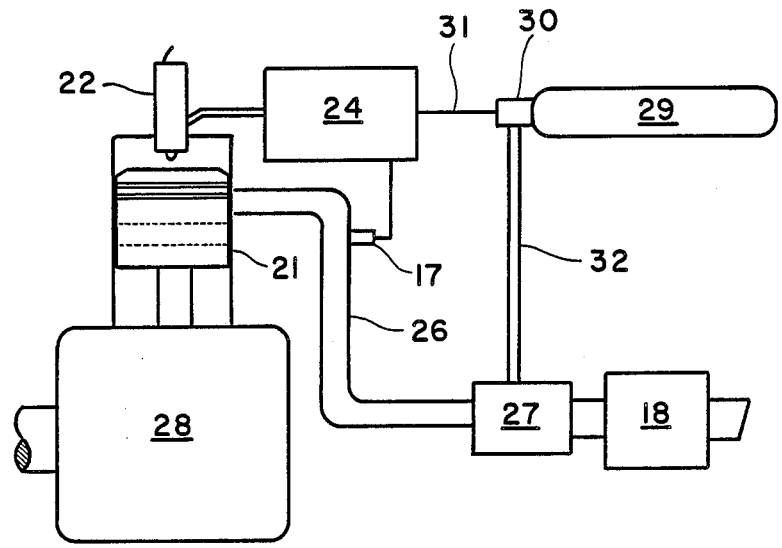
FIG. 3 shows the basic design of an internal combustion engine operating on the self-ignition principle only and having an added external source of carbon monoxide.

As an example of a stationary diesel engine for use with the method of the present invention, FIG. 3 illustrates the basic design of an internal combustion engine 28 operating solely on the self-ignition principle. An external carbon monoxide source 29, which may be a gas bottle containing carbon monoxide gas, is supplied. The carbon monoxide source 29 has a regulated or controlled valve 30, which communicates via a control line 31 with the fuel preparation system 24. From the valve 30, a gas line 32 leads into the mixer 27, in which the exhaust gases from the cylinder 21 are mixed with the carbon monoxide furnished in the regulated amount. After mixing, the exhaust gases are delivered to the catalytic converter 18 for reduction.

During operation of the engine 28, it is primarily nitrogen oxides that are generated, and in an individually regulated manner, via suitable sensor systems or suitable sensors, enough CO is always furnished to the mixer 27 so that once the exhaust gases from the combustion chamber of the cylinder 21 and from the carbon monoxide source 29 have been put together, a practically complete catalytic detoxification in the catalytic converter 18 is assured. Thus the required quantity of carbon monoxide is added here in an individually regulated manner, so that adherence to predetermined portions leads, after the exhaust gases have been put together, to practically complete detoxification using known catalytic systems.

What is claimed:

1. A method for detoxifying exhaust gas components of a diesel engine, the engine having at least two combustion chambers with separate, regulatable fuel preparation systems and separate exhaust gas lines, exhaust gas sensors in the exhaust gas lines, a catalytic converter and a carbon monoxide source, said method comprising the steps of:
   sensing the exhaust gas components in the individual exhaust gas lines;
   regulating the air/fuel mixture supplied by each fuel preparation system to its respective combustion chamber so that a predetermined proportion is reached of the exhaust gas components of the exhaust gas lines;
   delivering the exhaust gas components from the exhaust gas lines to the catalytic converter; and
   supplying carbon monoxide to the catalytic converter as needed for detoxification of the exhaust gas components.

2. A method for detoxifying exhaust gas components of a diesel engine according to claim 1, further comprising the step of combusting the fuel mixture at a predetermined temperature of optimal thermodynamic efficiency to prevent formation of soot.

3. A method for detoxifying gas components of an internal combustion engine, the engine having at least two combustion chambers, each with regulatable fuel preparation systems, exhaust gas lines, and exhaust gas lines sensors; a mixer; and a catalytic converter, at least one of the combustion chambers operating under the principle of self-ignition said method comprising the steps of:
   sensing the exhaust gas components in the exhaust gas lines;
   regulating fuel provided to the combustion chambers in response to data sensed in said sensing step so that the combustion chambers generate the main toxic components in a predetermined proportion;
   delivering the exhaust gas components from the exhaust gas lines to the mixer;
   mixing the exhaust gas components in the mixer;
   delivering the mixed exhaust gas components to the catalytic converter;
   supplying carbon monoxide to the catalytic converter when said sensing step indicates additional carbon monoxide is required for detoxification; and
   detoxifying the mixed exhaust gas components.

4. An internal combustion engine for allowing complete detoxification of exhaust gas, the exhaust gas having individual components including carbon monoxide, nitrogen oxides and hydrocarbons, said engine comprising:
- first and second individual combustion chambers;
- first and second fuel preparation systems connected to said first and second individual combustion chambers, respectively, for controlling fuel provided to said first and second combustion chambers said fuel preparation systems independently operatable and regulatable from one another;
- first and second exhaust gas lines for withdrawing the exhaust gas from said first and second combustion chambers, respectively;
- first and second sensors located in said first and second exhaust lines, respectively, for detecting quantities of the individual components of the exhaust gas and relaying the detected quantities to said first and second fuel preparation systems, respectively;
- a mixer for mixing the exhaust gas from said first and second exhaust gas lines; and
- a catalytic converter for complete catalytic detoxification of the exhaust gas.

5. An apparatus according to claim 4, wherein said first combustion chamber is a self-ignition type combustion chamber and said second combustion chamber is an externally supplied ignition type combustion chamber.

6. An apparatus according to claim 4, wherein said first and second combustion chambers are self-ignition type combustion chambers, said apparatus further comprising a carbon monoxide source for supplying additionally required carbon monoxide to said catalytic converter.

* * * * *